US009523502B2

United States Patent
Ruberte Sanchez et al.

(10) Patent No.: US 9,523,502 B2
(45) Date of Patent: Dec. 20, 2016

(54) LOW PROFILE PUSH-LOCK DEVICE

(71) Applicant: UNITED TECHNOLOGIES CORPORATION, Hartford, CT (US)

(72) Inventors: Jose E. Ruberte Sanchez, Jupiter, FL (US); Timothy J. McAlice, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 569 days.

(21) Appl. No.: 14/173,935

(22) Filed: Feb. 6, 2014

(65) Prior Publication Data

US 2014/0255172 A1    Sep. 11, 2014

Related U.S. Application Data

(60) Provisional application No. 61/776,297, filed on Mar. 11, 2013.

(51) Int. Cl.
| | |
|---|---|
| *F02K 1/82* | (2006.01) |
| *F23R 3/00* | (2006.01) |
| *F23R 3/60* | (2006.01) |
| *F16B 19/10* | (2006.01) |
| *F16B 21/02* | (2006.01) |

(52) U.S. Cl.
CPC ............. *F23R 3/002* (2013.01); *F16B 19/109* (2013.01); *F23R 3/007* (2013.01); *F23R 3/60* (2013.01); *F16B 21/02* (2013.01); *F23R 2900/00017* (2013.01); *Y10T 29/49826* (2015.01)

(58) Field of Classification Search
CPC ....... F16B 21/165; F16B 19/109; F02K 1/822; F02K 1/827; F02K 1/80; F02K 1/82; F23R 3/002; F23R 3/007; F23R 3/60; F23R 2900/00017
See application file for complete search history.

(56) References Cited

U.S. PATENT DOCUMENTS

| | | | |
|---|---|---|---|
| 6,283,660 B1 | 9/2001 | Furlong et al. | |
| 6,664,953 B2 | 12/2003 | Quek | |
| 7,508,383 B2 | 3/2009 | Lev et al. | |
| 2014/0116057 A1* | 5/2014 | Peters | F23M 5/04 60/753 |

FOREIGN PATENT DOCUMENTS

| | | |
|---|---|---|
| EP | 1221383 | 7/2002 |
| GB | 2322401 | 8/1998 |

OTHER PUBLICATIONS

U.S. Appl. No. 13/661,650, filed Oct. 26, 2012.

* cited by examiner

*Primary Examiner* — Richard Edgar
(74) *Attorney, Agent, or Firm* — Carlson, Gaskey & Olds, P.C.

(57) ABSTRACT

A push-lock device for connecting a tile to a gas turbine engine wall includes, among other things, a housing extending longitudinally along an axis; a shaft assembly within the housing, the shaft assembly including portions of both a push-down pop-up mechanism and a locking-bracket mechanism, the locking-bracket mechanism moveable to a locked position such that the locking-bracket mechanism limits movement of a tile away from a gas turbine engine wall; and a biasing member to be positioned closer to the tile than the locking-bracket mechanism.

19 Claims, 5 Drawing Sheets

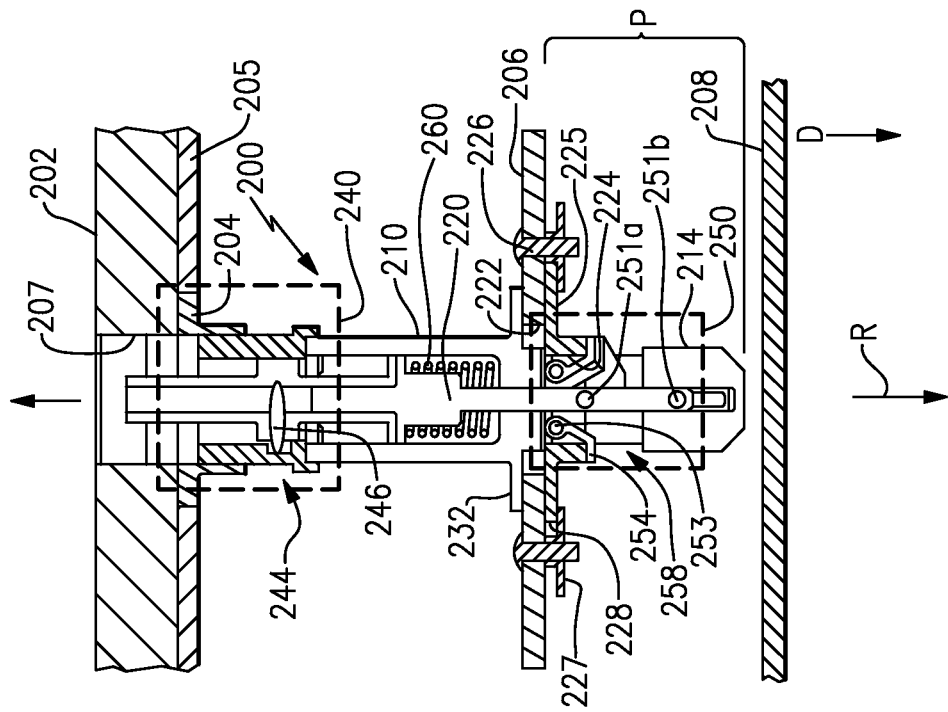
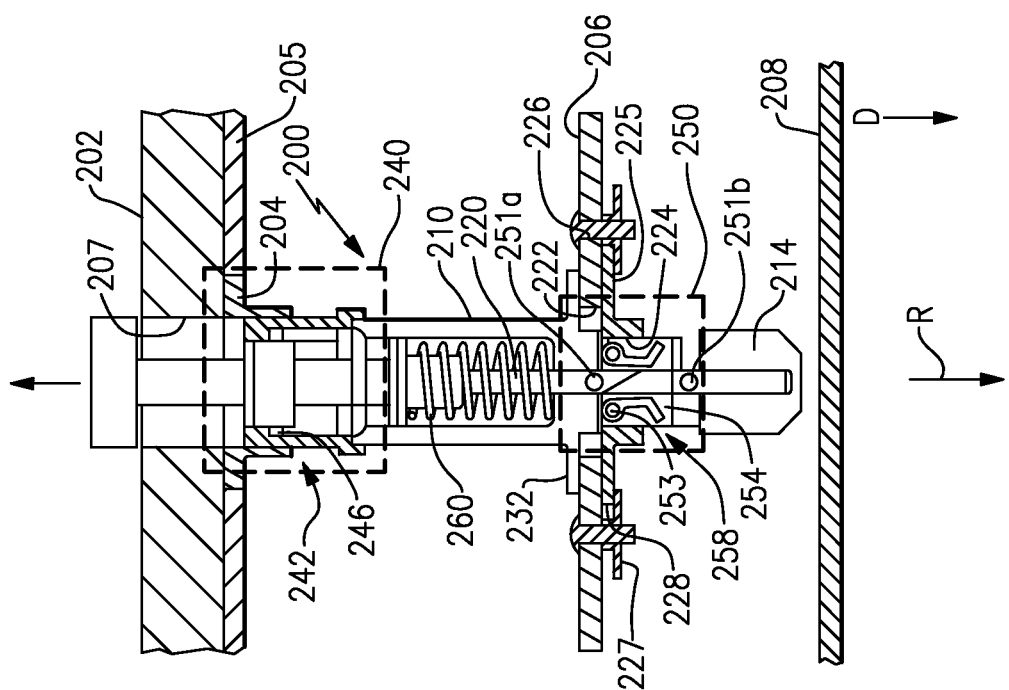

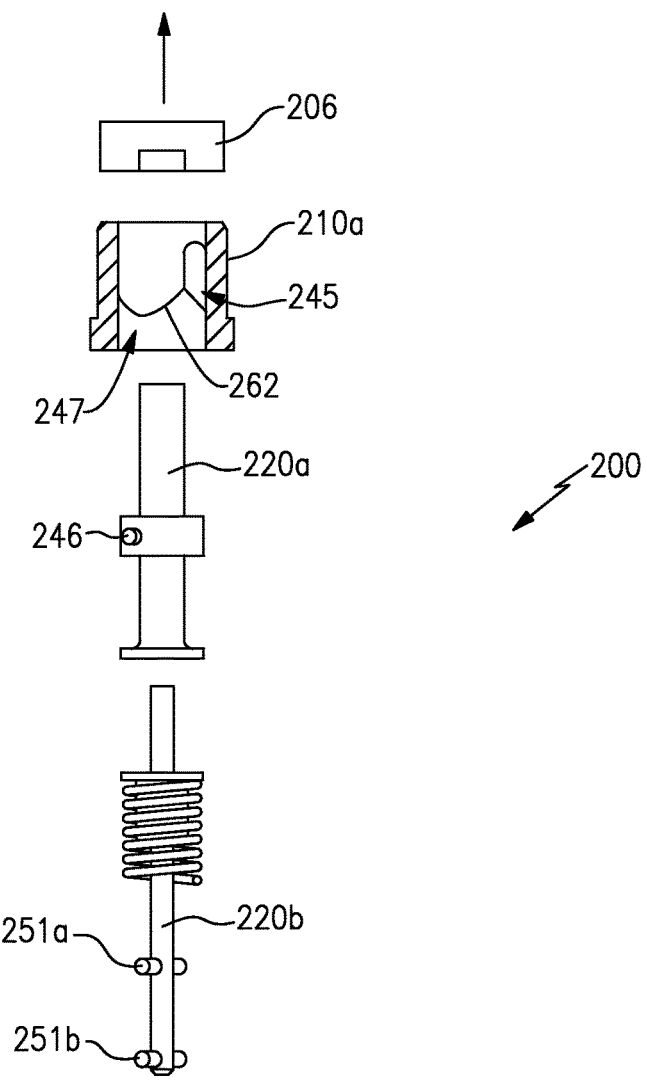
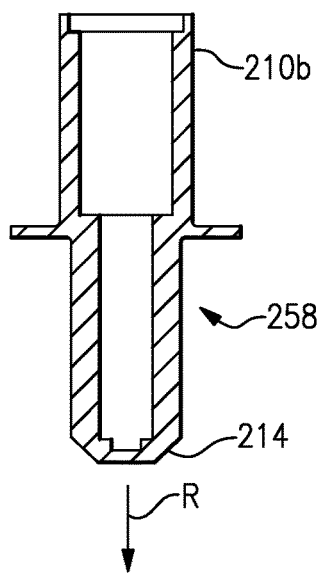
FIG.5

LOW PROFILE PUSH-LOCK DEVICE

CROSS-REFERENCE TO RELATED APPLICATIONS

This disclosure claims priority to U.S. Provisional Application No. 61/776,297, which was filed on 11 Mar. 2013 and is incorporated herein by reference.

BACKGROUND

Aircraft engines, in both commercial and military aircraft, incorporate heated gas flows as part of their standard operations. In order to protect portions of the engine from the excess heat generated by the heated gas flows, insulation tiles are installed in some areas of the gas flow path.

With current fastener designs, a technician installing or replacing the insulation tiles requires access to the backside of the engine substructure that the tile is attached to. In order to access the backside of the substructure, the engine is removed from the aircraft. Removing the engine to facilitate replacing or repairing an insulation tile significantly increases cost beyond the actual costs of replacing the tile itself.

SUMMARY

A push-lock device for connecting a tile to a gas turbine engine wall according to an exemplary aspect of the present disclosure includes, among other things, a housing extending longitudinally along an axis; a shaft assembly within the housing, the shaft assembly including portions of both a push-down pop-up mechanism and a locking-bracket mechanism, the locking-bracket mechanism moveable to a locked position such that the locking-bracket mechanism limits movement of a tile away from a gas turbine engine wall; and a biasing member to be positioned closer to the tile than the locking-bracket mechanism.

In a further non-limiting embodiment of the foregoing push-lock pin, the shaft assembly comprises a rotatable portion and a separate, fixed portion, the rotatable portion associated with the push-down pop-up mechanism, the fixed portion associated with the locking-bracket mechanism.

In a further non-limiting embodiment of any of the foregoing push-lock pins, the push-lock device extends along the axis in a first direction from the tile through an aperture in the gas turbine engine wall, wherein the push-lock device extends no more than one inch past the gas turbine engine wall.

In a further non-limiting embodiment of any of the foregoing push-lock pins, a floating support secured to the gas turbine engine wall, the floating support providing an aperture that receives the shaft assembly.

In a further non-limiting embodiment of any of the foregoing push-lock pins, the locking-bracket mechanism is moveable between the locked position and an unlocked position in response to actuation of the push-down pop-up mechanism.

In a further non-limiting embodiment of any of the foregoing push-lock pins, the tile is free to move away from the gas turbine engine wall when the locking-bracket mechanism is in the unlocked position.

In a further non-limiting embodiment of any of the foregoing push-lock pins, a stop feature is included to limit movement of the tile toward the gas turbine engine wall.

In a further non-limiting embodiment of any of the foregoing push-lock pins, the stop member is a flange extending radially from the housing.

In a further non-limiting embodiment of any of the foregoing push-lock pins, the locking-bracket mechanism comprises at least one locking bracket that pivots to move the locking-bracket mechanism between the locked position and the unlocked position.

In a further non-limiting embodiment of any of the foregoing push-lock pins, a primary pin extends from the shaft assembly to contact the locking bracket and move the locking-bracket mechanism from the unlocked position to the locked position.

In a further non-limiting embodiment of any of the foregoing push-lock pins, a secondary pin extends from the shaft assembly to contact the locking bracket and move the locking-bracket mechanism from the locked position to the unlocked position.

In a further non-limiting embodiment of any of the foregoing push-lock pins, the primary pin is spaced from the secondary pin along the axis.

A gas turbine engine assembly according to another exemplary aspect of the present disclosure includes, among other things, a tile; an inner wall radially outside the tile; an outer structure radially outside the inner wall; a push-lock device extending along an axis; the push-lock device including a push-down pop-up mechanism and a locking-bracket mechanism, the locking-bracket mechanism moveable to a locked position such that the locking-bracket mechanism limits movement of the tile away from the inner wall; and a biasing member of the push-lock device positioned closer to the tile than the locking-bracket mechanism.

In a further non-limiting embodiment of the foregoing gas turbine engine, the push-lock device extends along the axis toward the outer structure no more than one inch past the inner wall.

In a further non-limiting embodiment of the foregoing gas turbine engine, the tile comprises a ceramic tile.

In a further non-limiting embodiment of the foregoing gas turbine engine, the push-lock pin extends along the axis in a first direction from the tile through an aperture in the gas turbine engine wall, wherein the push-lock pin extends no more than one inch past the gas turbine engine wall.

In a further non-limiting embodiment of the foregoing gas turbine engine, the push-lock device extends through an aperture within a floating support that is secured to the inner wall and is laterally adjustable relative to inner wall.

A method of connecting a tile to a gas turbine engine wall, according to an exemplary aspect of the present disclosure includes, among other things, using a push-down pop-up mechanism to move a locking-bracket mechanism between an unlocked position and a locked position; limiting movement of a tile away from a gas turbine engine wall when the locking-bracket mechanism is in the locked position; and positioning a biasing member of the push-lock device closer to the tile than the locking-bracket mechanism.

In a further non-limiting embodiment of the foregoing method of connecting a tile, the method includes pivoting at least one locking bracket to move the locking-bracket mechanism between the locked position and the unlocked position.

These and other features of the present invention can be best understood from the following specification and drawings, the following of which is a brief description.

BRIEF DESCRIPTION OF THE DRAWINGS

FIG. 3A schematically illustrates a first example push-lock device connector in an unlocked position.

FIG. 3B schematically illustrates the first example push-lock device connector in a locked position.

FIG. 5 illustrates an exploded, partial section view of the push-lock device connector of FIGS. 3A and 3B.

DETAILED DESCRIPTION

Figure 1:
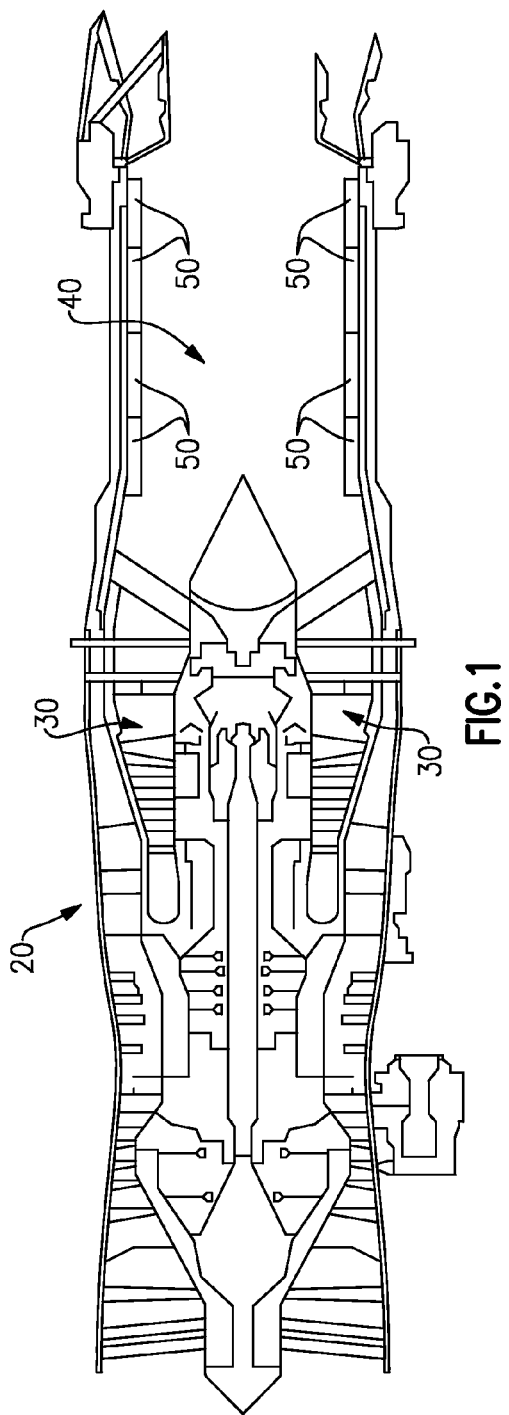
FIG. 1 schematically illustrates an example gas turbine engine.

Referring to FIG. 1, an example gas turbine engine 20 including a gas path 30 that outputs heated gas into an exhaust gas path 40. To prevent heat damage to the exhaust gas path 40 walls, and to other components adjacent the exhaust gas path 40, the exhaust gas path 40 is lined with panels, such as ceramic insulation tiles 50. The example ceramic insulation tiles 50 are each connected to the walls of the exhaust gas path 40 via a number of push-lock devices.

Existing exhaust liners utilize a single metal sheet with multiple air holes. Cooling air is pumped through the air holes to cool the exhaust gas path 40 according to known active cooling techniques. The existing exhaust gas path 40 liners are permanently affixed to the turbine engine exhaust gas path 40 walls. As a result, in order to perform maintenance on the exhaust gas path liner the gas turbine engine 20 must be removed from the aircraft.

The example ceramic insulation tiles 50 of this disclosure have a significantly higher heat capacity than a metal liner and thus do not need to be actively cooled to prevent heat from passing through the exhaust gas path 40 walls. The ceramic insulation tiles 50 are each individually connected to the exhaust gas path walls, and combine to form a tiled exhaust gas path liner that protects engine components adjacent to the exhaust gas path from excess heat.

Figure 2:
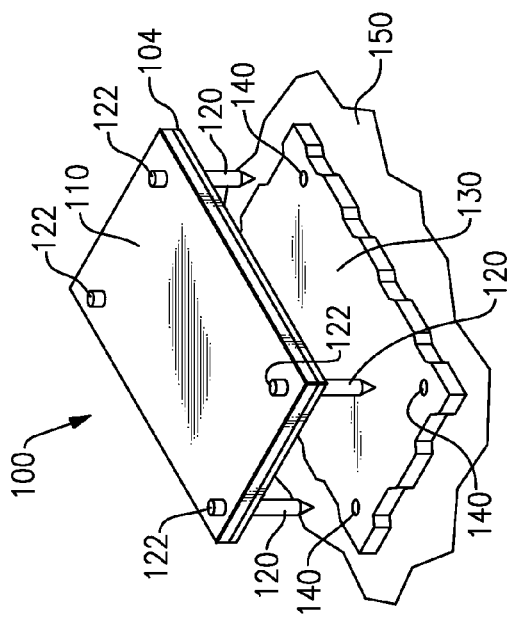
FIG. 2 schematically illustrates an insulation tile assembly that can be used in the gas turbine engine of FIG. 1.
Figure 4:
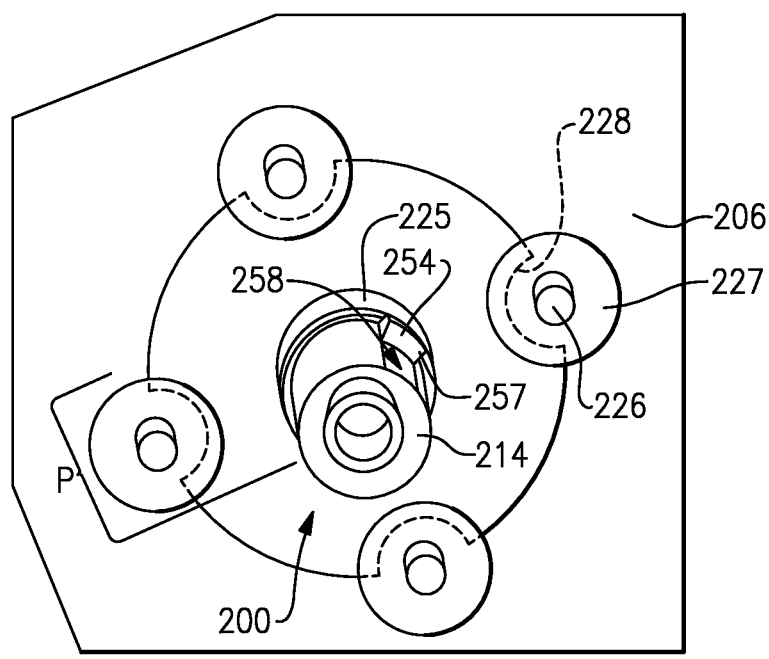
FIG. 4 illustrates a perspective view of a tip end of the push-lock device connector in the position of FIG. 3B with an outer wall removed.
Figure 6:
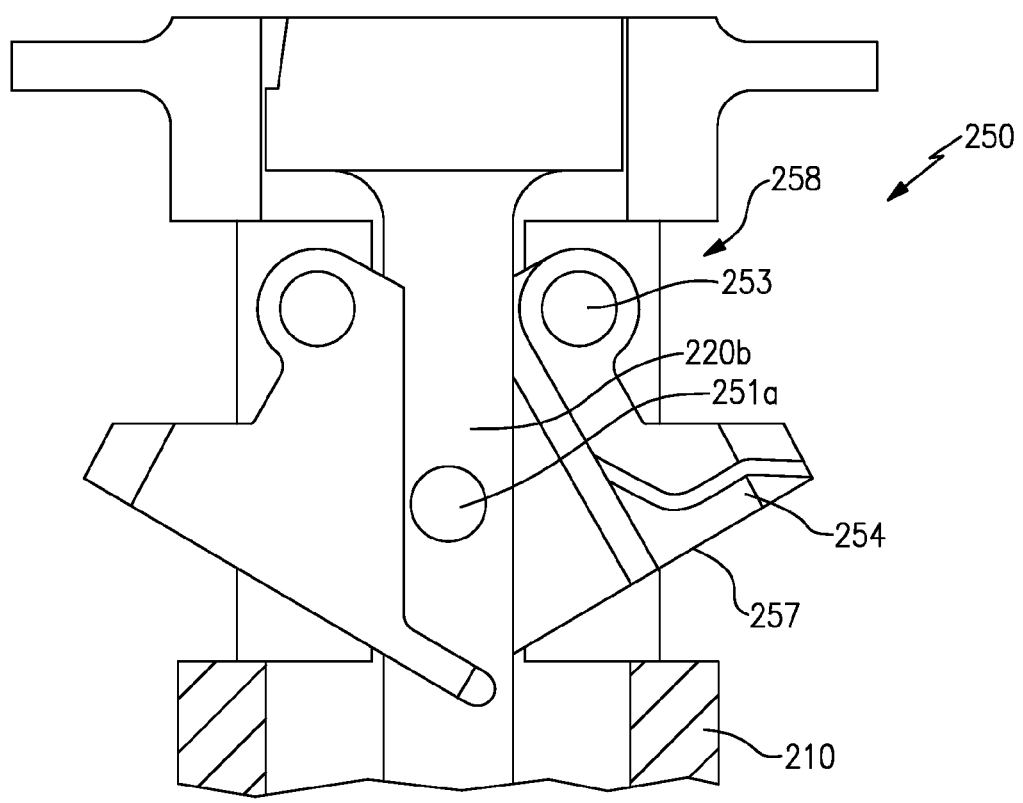
FIG. 6 illustrates a close-up view of a locking-bracket mechanism of the push-lock device connector of FIGS. 3A and 3B.

FIG. 2 schematically illustrates an example insulation tile assembly 100 that can be used in the exhaust gas path 40 of FIG. 1. The insulation tile assembly 100 includes an insulation tile 110 with multiple push-lock connectors 120 protruding from the tile 110. In this example, the tile 110 is a ceramic tile mounted to a base plate 104. The push-lock connectors 120 engage with an inner wall 130 of the exhaust gas path 40 via corresponding connection features 140 in the inner wall 130. The corresponding connection features 140 are apertures in this example. The inner wall 130 is a metal substrate in this example. The inner wall 130 may be spaced radially inward from an outer structure 150, such as a wall, airframe, or duct. In another example, the push-lock connectors 120 may extend from the inner wall 130 rather than the tile 110.

To connect the tile 110 to the inner wall 130, the push-lock connectors 120 are inserted into the connection features 140. Once inserted, a cap 122 on the push-lock connector 120 is pushed, placing the push-lock connector 120 in a locked position. To unlock the push-lock connector 120, the cap 122 is pushed again, placing the push-lock connector 120 in an unlocked position. When the push-lock connectors 120 are in the locked position, the tile 110 cannot be removed from the inner wall 130. In the locked position, the cap 122 is flush with the surface of tile 110. When the push-lock connectors 120 are in the unlocked position, the tile 110 can be removed and replaced. In the unlocked position, the cap 122 is protruding from the surface of tile 110. This creates a handle to facilitate the removal of tile 110. The cap 122 further includes a top ceramic surface matching the tile 110 such that the cap 122, when the push-lock connector 120 is in the locked position, has a ceramic surface flush with the tile 110.

When connected to the inner wall 130, at least some portion of the push-lock connectors 120 extends past the inner wall 130 toward the outer structure 150. Tight clearances between the inner wall 130 and the outer structure 150 can make it difficult to accommodate this portion of the push-lock connectors 120.

Referring to FIGS. 3A to 6, an example push-lock device 200 can be utilized in the example ceramic insulation tile arrangement of FIG. 2. FIG. 3A shows the push-lock device 200 in an unlocked position, and FIG. 3B shows the push-lock device 200 in a locked position. The push-lock device 200 secures a ceramic tile 202 to a substrate 206 that is spaced radially inside an outer structure 208. The ceramic tile 202 is mounted to a base plate 205.

The example push-lock device 200 includes a housing assembly 210 and a shaft assembly 220 received within the housing 210 and extending longitudinally along a radial axis R. In operation, the shaft 220 is moved relative to the housing 210 to permit or restrict movement of push-lock device 200, and thus the ceramic tile 202, relative to the substrate 206.

The push-lock device 200 extends through an opening 207 in the ceramic tile 202. The housing 210 of the push-lock device 200 is directly affixed to the ceramic tile 202 via an adapter 204. The adaptor 204 can be a bracket, for example, and can be affixed to the housing 210 and the ceramic tile 202 using any known method.

The example housing 210 includes has a tip 214 that is tapered to assist in moving the push-lock device 200 into an aperture 222 of the substrate 206 during installation of the ceramic tile 202 to the substrate 206. The housing 210 extends through the aperture 222 in the substrate 206 and an aperture 224 within a floating support, such as a washer 225. The aperture 224 is smaller than the aperture 222.

Pins 226, or some other type of fastener, are used to secure the washer 225 to the substrate 206. The washer 225 is held between flanged bushings 227 and the substrate 206 in this example, which allows the washer 225 to float or shift slightly relative to the substrate 206 while still being held securely. The washer 225 can be considered laterally adjustable due to its ability of float or shift.

The washer 225 includes cutouts 228. The cutouts 228 are hemispherical in this example, but could have other profiles. The cutouts 228 provide the washer with freedom to shift. The washer 225 is thus held such that some movement of the aperture 224 relative to the aperture 222 is permitted.

During assembly, when the housing 210 is inserted into the apertures 222 and 224, the aperture 224 may need to move or shift relative to the aperture 224. Relative movement may be required to accommodate expansion and contraction, of the washer 225 relative to the flanged bushings 227, the pins 226, or both. Relative movement may be required due to build-tolerances.

The housing 210 includes a guide portion 210a and a base portion 210b. The base portion 210b includes the tip 214. A flange 232 extends outward from base portion 210b. and past the perimeter of the aperture 222, which limits movement of the push-lock device 200 and the ceramic tile 202 toward the substrate 206. The flange 232 enables the push-lock device 200 to absorb compressive loads against the ceramic tile 202 in the direction D.

The flange 232 is an example type of stop feature. Other examples may include ridges, pins, arms, etc., that extend outward from the housing 210 or some other portion of the push-lock device 200.

The example shaft 220 includes portions of a locking-bracket mechanism 250 and portions of a push-down pop-up mechanism 240. A biasing member, such as a spring 260, is positioned between the locking-bracket mechanism 250 and the push-down pop-up mechanism 240. The spring 260 is positioned along the axis between the ceramic tile 202 and the substrate 206. The spring 260 is positioned along the radial axis R inside the locking-bracket mechanism 250. The spring 260 is closer to the ceramic tile 202 than the locking-bracket mechanism 250.

A portion P of the push-lock device 200 is positioned along the radial axis R between the substrate 206 and the outer structure 208. In the example embodiment, the spring 260 is between the ceramic tile 202 and the substrate 206, and the portion P does not accommodate any portion of the spring 260. The portion P can thus be made shorter to facilitate packaging the push-lock device 200 within the gas turbine engine 20, and particularly between the substrate 206 and outer structure 208. The length of the portion P along the axis is equal to or less than 1 inch (2.54 centimeters) in this example, which causes the portion P to be spaced about 1.25 inches (3.18 centimeters) from the outer structure 208.

In this example, the shaft 220 is a two-piece shaft having a rotatable portion 220a and a fixed portion 220b (FIG. 5). The rotatable portion 220a includes features causing it to index and rotate within the housing 210 when the cap 230 is depressed.

Referring now to the locking-bracket mechanism 250, pins 251 extend from the shaft 220. The pins 251 include primary pins 251a and secondary pins 251b. At least one pivot pin 253 is used to pivotably attach locking features, such as locking brackets 254, to the base portion 210b of the housing 210.

When the shaft 220 shifts along the radial axis R from the unlocked position of FIG. 3A to the locked position of FIG. 3B, the primary pins 251a push against the locking brackets 254 to pivot them outward past the perimeter of the aperture 224. The primary pins 251a push the locking brackets 252 outward through openings 258 in the base portion 210b of the housing 210. When the push-lock device 200 is in a locked position of FIG. 3B, the locking brackets 254 remain pushed out through the openings 258 due to their alignment along the radial axis R with the pins 251. Contact between the locking brackets 254 and the washer 225 prevents the push-lock device 200 from being withdrawn from the substrate 206.

Contacting the locking brackets 254 against the washer 225 rather than the substrate 206 facilitates positional variations due to relative thermal expansion between components. The washer 225 can shift slightly relative to the substrate 206, but still provide an effective anchoring location for the locking brackets 254. The locking brackets 254 contact the washer 225 across a relatively large area of contact, which can reduce stresses.

The example locking-bracket mechanism 250 includes two locking brackets 254. Other examples of the locking-bracket mechanism 250 may include some other number of locking brackets 254.

Other examples of the locking-bracket mechanism 250 may include locking features other than locking brackets. Other example locking features may include ball-lock mechanisms, cam and pin mechanism, etc., Examples of some other locking features may be found in U.S. application Ser. No. 13/661,650, the disclosure of which is incorporated herein by reference.

When the shaft 220 shifts along the radial axis R from the locked position of FIG. 3B to the unlocked position of FIG. 3A, the primary pins 251a become misaligned with the locking brackets 254. The secondary pins 251b then slide against a surface 257 of the locking brackets 254 to cause the locking brackets 254 to pull a pivot inward toward the radial axis R. When the push-lock device 200 is in an unlocked position, the locking brackets 254 are within a perimeter of the housing 210. The push-lock device 200 can thus be removed from the substrate 206 by moving the push-lock device 200 in a direction opposite the direction R.

In this example, the push-down pop-up mechanism 240 of the push-lock device 200 comprises mechanical features of the shaft 220 and the housing 210, particularly the guide portion 210a of the housing 210. The guide portion 210a defines at least a deep groove 245 and a shallow groove 247. The shaft 220 includes at least one finger 246 that is received within the deep groove 245 or the shallow groove 247 depending on the circumferential orientation of the shaft 220 relative to the housing 210.

When the finger 246 is located in the deep groove 245, the finger 246 is in a low equilibrium point 242. When the finger 246 is in the shallow groove 247, the finger 246 is in a high equilibrium point 244. Activation of the cap 230 causes the finger 256 to move between the low equilibrium point 242 and the high equilibrium point 244.

More specifically, pressing the cap 230 moves the finger 256 axially out of the deep groove 245 or the shallow groove 247. When the cap 230 is released, the spring 260 exerts an axial force on the shaft 220 causing the finger 246 to contact a ramped area 262. As the finger 246 is pressed against the ramped area 262 by the spring 260, the finger 246 slides against the ramped area 262 causing the rotating portion 220a of the shaft 220 to rotate. Essentially, the finger 246 acts as an indexing tab. If the finger 256 was in a deep groove 245, the rotation causes the finger 256 to move into the shallow groove 247. If the finger 256 was in the shallow groove 247, the rotation causes the finger 256 to move into the deep groove 245.

Activating the push-down pop-up mechanism (depressing the cap 230) thus shifts the finger 256 from one equilibrium point 242, 244 to the other equilibrium point 242, 244. When the finger 256 is in the high equilibrium point 244 (FIG. 3B) the locking-bracket mechanism 250 is maintained in the locked position via the biasing force provided by the spring 260. The cap 230 is maintained approximately flush with the ceramic tile 202. When the finger 256 is resting in the low equilibrium point 242, the locking-bracket mechanism 250 is unlocked, and the cap 230 is not flush with the ceramic tile 202.

While the above disclosure is directed toward insulation tiling for an aircraft engine, it is understood that the described connector pin can be utilized in any application where it is desirable to connect a tile to a surface without providing access to a reverse side of the surface.

Features of the disclosed examples include a push-lock device having a biasing member that is positioned at least partially on a flow path side of a substrate. The example push-lock device has lesser protraction outward past the substrate than other designs. The locking-bracket mechanism provides increased contact area between the push-lock device and the substrate, washer, or both. Increased contact area reduced contact stresses.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A push-lock device for connecting a tile to a gas turbine engine wall comprising:
   a housing extending longitudinally along an axis;
   a shaft assembly within the housing, the shaft assembly including portions of both a push-down pop-up mechanism and a locking-bracket mechanism, the locking-bracket mechanism moveable to a locked position such that the locking-bracket mechanism limits movement of a tile away from a gas turbine engine wall; and
   a biasing member to be positioned closer to the tile than the locking-bracket mechanism.

2. The push-lock device of claim 1, wherein the shaft assembly comprises a rotatable portion and a separate, fixed portion, the rotatable portion associated with the push-down pop-up mechanism, the fixed portion associated with the locking-bracket mechanism.

3. The push-lock device of claim 1, wherein the push-lock device extends along the axis in a first direction from the tile through an aperture in the gas turbine engine wall, wherein the push-lock device extends no more than one inch past the gas turbine engine wall.

4. The push-lock device of claim 1, including a floating support secured to the gas turbine engine wall, the floating support providing an aperture that receives the shaft assembly.

5. The push-lock device of claim 1, wherein the locking-bracket mechanism is moveable between the locked position and an unlocked position in response to actuation of the push-down pop-up mechanism.

6. The push-lock device of claim 5, wherein the tile is free to move away from the gas turbine engine wall when the locking-bracket mechanism is in the unlocked position.

7. The push-lock device of claim 1, including a stop feature to limit movement of the tile toward the gas turbine engine wall.

8. The push-lock device of claim 7, wherein the stop member is a flange extending radially from the housing.

9. The push-lock device of claim 1, wherein the locking-bracket mechanism comprises at least one locking bracket that pivots to move the locking-bracket mechanism between the locked position and the unlocked position.

10. The push-lock device of claim 9, wherein a primary pin extends from the shaft assembly to contact the locking bracket and move the locking-bracket mechanism from the unlocked position to the locked position.

11. The push-lock device of claim 10, wherein a secondary pin extends from the shaft assembly to contact the locking bracket and move the locking-bracket mechanism from the locked position to the unlocked position.

12. The push-lock device of claim 11, wherein the primary pin is spaced from the secondary pin along the axis.

13. A gas turbine engine, comprising:
   a tile;
   an inner wall radially outside the tile;
   an outer structure radially outside the inner wall;
   a push-lock device extending along an axis; the push-lock device including a push-down pop-up mechanism and a locking-bracket mechanism, the locking-bracket mechanism moveable to a locked position such that the locking-bracket mechanism limits movement of the tile away from the inner wall; and
   a biasing member of the push-lock device positioned closer to the tile than the locking-bracket mechanism.

14. The gas turbine engine of claim 13, wherein the push-lock device extends along the axis toward the outer structure no more than one inch past the inner wall.

15. The gas turbine engine of claim 13, wherein the tile comprises a ceramic tile.

16. The gas turbine engine of claim 13, wherein the push-lock device extends along the axis in a first direction from the tile through an aperture in the inner wall, wherein the push-lock device extends no more than one inch past the inner wall.

17. The gas turbine engine of claim 13, wherein the push-lock device extends through an aperture within a floating support that is secured to the inner wall and is laterally adjustable relative to inner wall.

18. A method of connecting a tile to a gas turbine engine wall, comprising:
   using a push-down pop-up mechanism to move a locking-bracket mechanism between an unlocked position and a locked position;
   limiting movement of a tile away from a gas turbine engine wall when the locking-bracket mechanism is in the locked position; and
   positioning a biasing member of the push-lock device closer to the tile than the locking-bracket mechanism.

19. The method of claim 18, pivoting at least one locking bracket to move the locking-bracket mechanism between the locked position and the unlocked position.

* * * * *